E. L. SHARPNECK.
CAR AXLE.
APPLICATION FILED MAY 25, 1914.

1,193,434.

Patented Aug. 1, 1916.

WITNESSES:
Geo. W. Haines.
E. C. Murphy

INVENTOR.
Eliel L. Sharpneck.
BY
Henry J. Miller
ATTORNEY.

UNITED STATES PATENT OFFICE.

ELIEL L. SHARPNECK, OF WINTHROP, MASSACHUSETTS.

CAR-AXLE.

1,193,434.

Specification of Letters Patent.

Patented Aug. 1, 1916.

Application filed May 25, 1914. Serial No. 840,664.

*To all whom it may concern:*

Be it known that I, ELIEL L. SHARPNECK, a citizen of the United States, residing at Winthrop, in the county of Suffolk and State of Massachusetts, have invented certain new and useful Improvements in Car-Axles, of which the following is a specification, reference being had to the accompanying drawings, forming part thereof.

This invention has reference to improvements in car axles and particularly in car axles adapted for use in combination with anti-friction roller bearings having a yoke or member similar to that shown in my U. S. Letters Patent No. 1,100,403, dated June 16, 1914.

One object of the invention is to provide a car axle with a wear resisting sleeve with a member of which the yoke or member of the car axle box is adapted to be engaged.

Other objects of the invention will appear from the following description.

The invention consists in the car axle having the novel wear resisting sleeve herein shown.

The invention also consists in such other novel features of construction and combination of parts hereinafter more fully described and claimed.

Figure 1:
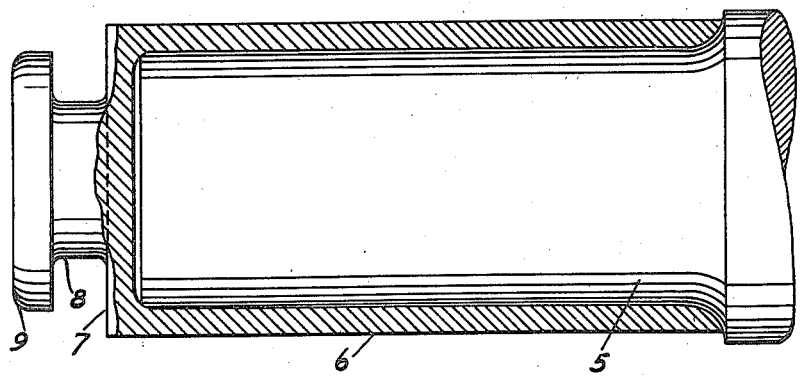
Figure 2:
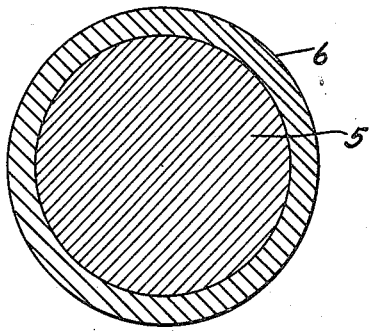

Figure 1, represents a side elevation of the improved car axle, its wearing sleeve being shown in section. Fig. 2, represents a sectional view of the same taken on line 2—2 Fig. 1.

Similar characters of reference designate corresponding parts throughout.

As shown in my patent, above named, the wear resisting sleeve of the car axle constituting one of the ways of the roller bearing is tubular throughout and the car axle is furnished near its outer end with an annular groove adapted to receive the yoke or member by means of which the car axle box is held in position relative to the car axle. Such construction is satisfactory in operation but is somewhat expensive in construction particularly as regards the application of the roller bearings to old car axles.

In carrying the present invention into practice it has been my object to so construct a wear resisting sleeve for car axles to be used with roller bearings that the car axle box may be connected with a member of said sleeve whereby the expense and time used in changing the structure of the axle may be avoided. I also find it desirable to completely cover the end of the axle.

As shown in the drawing 5 indicates the end portion of a car axle which axle preferably is cylindrical. Onto said axle 5 is driven by considerable pressure the sleeve 6 having the closed end 7 furnished with the projecting member or head 8 having the annular groove or neck 9 to receive the yoke or element of the car axle box referred to in said patent. The exterior of the sleeve 6 may be surface hardened while its inner surface may be of comparatively mild or low temper so that the frictional contact of said inner surface with the car axle 5 is sufficient to retain the sleeve 6 on the axle.

Having thus described my invention I claim as new and desire to secure by Letters Patent.

A car axle having an end of reduced diameter and a shoulder, and a sleeve of hard metal shrunk onto said reduced end and adapted to fit against said shoulder, the outer end of said sleeve being closed and having an integral stud extension having a head, the inner surface of said head extending parallel to said closed end of said sleeve.

ELIEL L. SHARPNECK.

Witnesses:
HENRY J. MILLER,
ESTHER C. MURPHY.